United States Patent
Lee et al.

(10) Patent No.: US 8,472,369 B2
(45) Date of Patent: Jun. 25, 2013

(54) UPLINK SCHEDULING METHOD USING ONE BIT PER USER FEEDBACK

(75) Inventors: Jae Hong Lee, Seoul (KR); Jung Min Choi, Seoul (KR)

(73) Assignee: SNU R&DB Foundation, Seoul (KR)

( * ) Notice: Subject to any disclaimer, the term of this patent is extended or adjusted under 35 U.S.C. 154(b) by 632 days.

(21) Appl. No.: 12/717,699

(22) Filed: Mar. 4, 2010

(65) Prior Publication Data

US 2011/0216714 A1 Sep. 8, 2011

(51) Int. Cl.
*H04B 7/212* (2006.01)
*H04W 4/00* (2009.01)
*H04J 3/16* (2006.01)
*H04J 3/02* (2006.01)

(52) U.S. Cl.
USPC ........... 370/322; 370/329; 370/341; 370/348; 370/437; 370/462

(58) Field of Classification Search
None
See application file for complete search history.

(56) References Cited

U.S. PATENT DOCUMENTS

2004/0023660 A1* 2/2004 Ben-Eli .................... 455/450
2009/0005028 A1* 1/2009 Haimovich et al. ....... 455/423

* cited by examiner

*Primary Examiner* — Ayaz Sheikh
*Assistant Examiner* — Sori Aga
(74) *Attorney, Agent, or Firm* — Tutunjian & Bitetto, P.C.

(57) ABSTRACT

An uplink scheduling method using one bit per user feedback includes: receiving one-bit feedback of the user's channel condition from a plurality of users, the one-bit feedback of the user's channel condition corresponds to a value of the cumulative distribution function of the user's instantaneous achievable rate; selecting a user from the users whose channel condition is equal to or greater than a predetermined threshold; and transmitting data at an instantaneous achievable rate of the selected user.

4 Claims, 2 Drawing Sheets

UPLINK SCHEDULING METHOD USING ONE BIT PER USER FEEDBACK

BACKGROUND

1. Field

Example embodiments relate to an uplink scheduling method using one bit per user feedback.

2. Description of the Related Art

In a wireless multiuser system wherein a plurality of users have independent fading channels, it is highly probable that one of the users always has a good channel condition. Hence, multiuser diversity may be utilized to enhance the sum-rate capacity of the system. However, to acquire multiuser diversity gain, channel gain has to be estimated for all the users and the user terminals have to transmit feedback information to the base station. Accordingly, a large quantity of feedback information is required.

The one-bit feedback scheme has been proposed to reduce feedback load for utilization of multiuser diversity. Based on the user's one-bit information, it is informed to the base station whether the user's channel gain is greater than the threshold. This method can achieve multiuser diversity gain in terms of the sum-rate capacity if a threshold is carefully chosen and the number of users is large. However, it deals only with a network in which all users have identical channel statistics. In real environment, however, the channel statistics are not identical since users which are closer to the base station have better average channel gains.

Accordingly, the one-bit feedback scheme can be applied only to the ideal environment where all the users have identical channel statistics.

SUMMARY

In one aspect, there is provided an uplink scheduling method using one bit per user feedback enabling acquisition of multiuser diversity gain in an environment where all users have non-identical channel statistics employing a cumulative distribution function (CDF)-based scheduler using a 1-bit feedback scheme.

An uplink scheduling method using one bit per user feedback according to an embodiment includes: receiving one-bit feedback of the user's channel condition from a plurality of users, the one-bit feedback of the user's channel condition corresponds to a value of the cumulative distribution function of the user's instantaneous achievable rate; selecting a user from the users whose channel condition is equal to or greater than a predetermined threshold; and transmitting data at an instantaneous achievable rate of the selected user.

Before the transmission of data, a user may be selected from the plurality of users if there is no user whose channel condition is equal to or greater than the predetermined threshold.

The disclosed uplink scheduling method using one bit per user feedback enables acquisition of multiuser diversity gain in an environment where the users have non-identical channel statistics.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
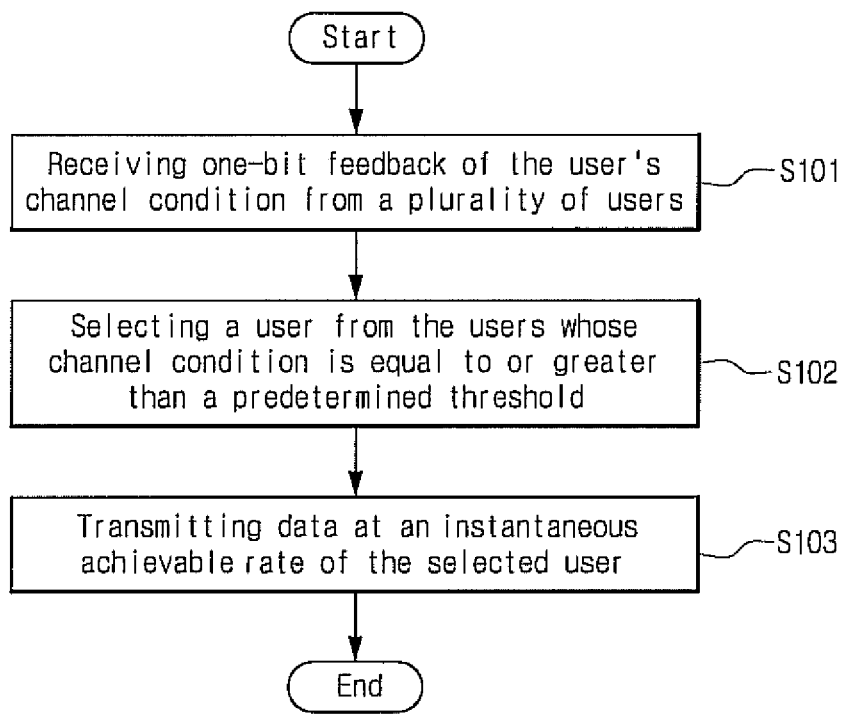
FIG. 1 is a flowchart illustrating an uplink scheduling method using one bit per user feedback according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

First, a cumulative distribution function (CDF)-based scheduler using full channel state information (CSI) will be considered for comparison with this disclosure. Let's consider a multiuser downlink system with K uses. Let $r_k(n)$ denote the instantaneous achievable rate of the user k at the timeslot n. The CDF-based scheduler selects a user $k^*(n)$ that satisfies Equation 1.

$$k^*(n) = \underset{k}{\mathrm{argmax}}\, F_{R_k}(r_k(n)) \qquad \text{Equation 1}$$

where $F_{R_k}(r)$ denotes the CDF of the instantaneous achievable rate of the user k. Equation 1 means that a user with the best channel condition is selected from the users.

Now, an uplink scheduling method employing a CDF-based scheduler using 1-bit feedback scheme will be described referring to FIG. 1.

FIG. 1 is a flowchart illustrating an uplink scheduling method using one bit per user feedback according to an embodiment.

An uplink scheduling method according to an embodiment may employ a CDF-based scheduler using 1-bit feedback scheme. An uplink scheduling method using one bit per user feedback according to an embodiment comprises four stages as follows.

First, the base station receives one-bit feedback of the user's channel condition from a plurality of users (S101). The user's channel condition may correspond to a value of the CDF of the user's instantaneous achievable rate.

Then, a user is selected from the users whose channel condition is equal to or greater than a predetermined threshold (S102). Here, that the channel condition is equal to or greater than the predetermined threshold may mean that the user's channel condition is good. In case the user's channel condition includes the value of the CDF of the instantaneous achievable rate of the user, a user whose value of the CDF of the instantaneous achievable rate is equal to or greater than a predetermined threshold may be selected from the users. That is to say, a user satisfying the relationship $F_{R_k}(r_k(n)) \geq \gamma$ may be selected, where $\gamma$ is the predetermined threshold.

The selection may be performed by 1-bit feedback scheme as follows. If $F_{R_k}(r_k(n))$ is equal to or greater than the predetermined threshold $\gamma$, the user k sends '1' as feedback bit, and if it is smaller than the predetermined threshold $\gamma$, '0' is sent as feedback bit. The base station selects one of the users that send the feedback '1'.

If there is no user that sends the feedback '1', i.e., if no user satisfies the relationship $F_{R_k}(r_k(n)) \geq \gamma$, the base station may select any user from all the users.

After the selection (S102), the base station transmits data at the instantaneous achievable rate of the selected user (S103).

The uplink scheduling method using one bit per user feedback has been described with reference to the flowchart. Although the method was illustrated and described by the blocks for convenience of description, certain blocks may be added or removed, and the sequence of the blocks may be altered.

In the afore-described uplink scheduling method according to an embodiment, the mean of the value of the selected user's CDF of the instantaneous achievable rate may be used as a performance measure. Let's consider a CDF-based scheduler using 1-bit feedback scheme. Since the mean changes depending on the threshold, it is needed to find the optimum threshold for maximizing the mean.

Let $\Lambda = \{1, 2, \ldots, K\}$ denote the user set. Suppose that the set of the users that send the feedback '1' is $\Omega$. Let $Z_{one-bit}$ denote the value of the CDF of the selected user's instantaneous achievable rate. If a non-empty set $\Omega$ is given, the conditional CDF of $Z_{one-bit}$ is given by Equation 2:

$$F_z(z \mid \Omega) = P(Z_{one-bit} \leq z \mid \Omega) = \sum_{j \in \Omega} P(\text{user } j \text{ is selected} \mid \Omega) P(U_j \leq z \mid \Omega) \quad \text{Equation 2}$$

where $U_j = F_{R_j}(R_j)$.

Similarly, if $\Omega$ is an empty set, the conditional CDF is given by Equation 3:

$$F_z(z \mid \Omega = \emptyset) = \sum_{j \in \Lambda} P(\text{user } j \text{ is selected} \mid \Omega = \emptyset) P(U_j \leq z \mid \Omega = \emptyset) \quad \text{Equation 3}$$

From Equations 2 and 3, the conditional CDF of $Z_{one-bit}$ is expressed as follows.

If $\Omega$ is a non-empty set, $$F_z(z \mid \Omega \neq \emptyset) = \begin{cases} 0, & \text{for } 0 \leq z \leq \gamma. \\ \dfrac{z-\gamma}{1-\gamma}, & \text{for } \gamma < z \leq 1. \end{cases} \quad \text{Equation 4}$$

If $\Omega$ is an empty set, $$F_z(z \mid \Omega = \emptyset) = \begin{cases} z/\gamma, & \text{for } 0 \leq z \leq \gamma. \\ 1, & \text{for } \gamma < z \leq 1. \end{cases} \quad \text{Equation 5}$$

Let $A_n$ denote the subset of the user set $\Lambda$ excluding the empty set $\emptyset$. The probability of $\Omega$ being equal to $A_n$ is given by Equation 6:

$$P(\Omega = A_n) = [P(U \leq \gamma)]^{K-I}[P(U > \gamma)]^I = \gamma^{K-I}(1-\gamma)^I \quad \text{Equation 6}$$

where I is the cardinality of $A_n$. The number of the subsets having a cardinality I is $_KC_I$. From Equations 4 to 6, the CDF of $Z_{one-bit}$ is given by Equation 7:

$$\begin{aligned} F_z(z) &= \sum_{n=1}^{2^K-1} F_z(z \mid \Omega = A_n) P(\Omega = A_n) + F_z(z \mid \Omega = \emptyset) P(\Omega = \emptyset) \\ &= \frac{z-\gamma}{1-\gamma} \sum_{I=1}^{K} {}_KC_I \gamma^{K-I}(1-\gamma)^I + \gamma^K \\ &= \frac{z-\gamma}{1-\gamma}(1-\gamma^K) + \gamma^K. \end{aligned} \quad \text{Equation 7}$$

For $0 \leq z \leq \gamma$, $$F_z(z) = z\gamma^{K-1} \quad \text{Equation 8}$$

By differentiating Equations 7 and 8, the PDF of $Z_{one-bit}$ is given by Equation 9:

$$f_z(z) = \begin{cases} \gamma^{K-1}, & \text{for } 0 \leq z \leq \gamma \\ \dfrac{1-\gamma^K}{1-\gamma}, & \text{for } \gamma < z \leq 1. \end{cases} \quad \text{Equation 9}$$

From Equation 9, Equation 10 is obtained.

$$E[Z_{one-bit}] = \frac{1}{2}(1 + \gamma - \gamma^K) \quad \text{Equation 10}$$

The optimum threshold should satisfy Equation 11.

$$\frac{dE[Z_{one-bit}]}{d\gamma} = \frac{1}{2}(1 - K\gamma^{K-1}) = 0 \quad \text{Equation 11}$$

Accordingly, from Equation 11, the optimum threshold is obtained as $\gamma_0 = K^{-1/(K-1)}$. Substituting $\gamma_0$ in Equation 10, the maximum mean of the CDF-based scheduler with 1-bit feedback scheme is given by Equation 12:

$$\max\{E[Z_{one-bit}]\} = \frac{1}{2}(1 + K^{-1/(K-1)} - K^{-k/(K-1)}) \quad \text{Equation 12}$$

Figure 2:
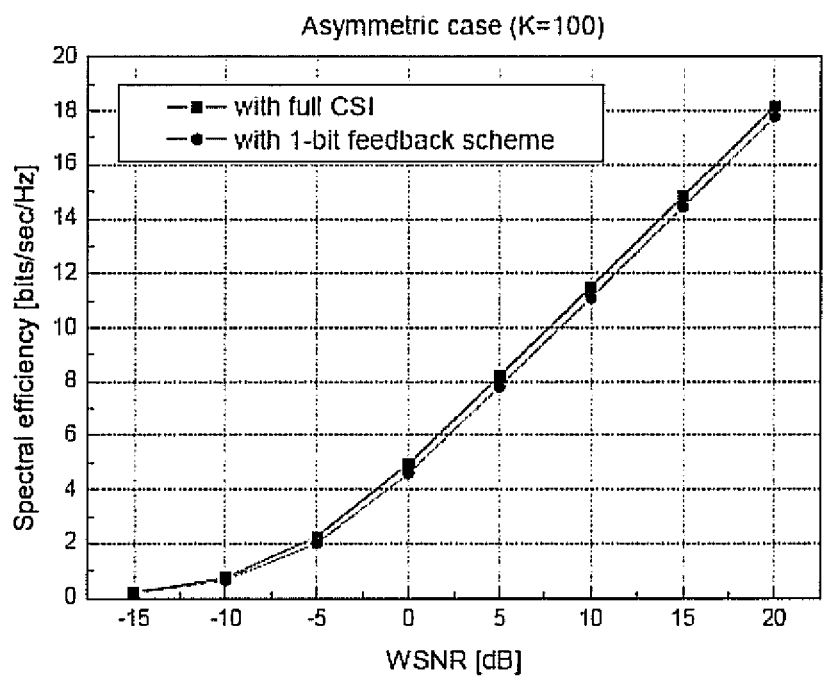
FIG. 2 shows a simulation result of an uplink scheduling method using one bit per user feedback according to an embodiment.

FIG. 2 shows a simulation result of an uplink scheduling method using one bit per user feedback according to an embodiment.

In the simulation, the threshold $\gamma_0$ was used to apply one-bit feedback. FIG. 2 shows data transfer rate when 100 users are uniformly distributed in a cell. In that case, average channel gain changes depending on the distance between the user and the base station. Thus, the average signal-to-noise ratio (SNR) obtained for the case where the user is located on the border of the cell is defined as the worst-case SNR (WSNR). FIG. 2 reveals that the performance of the one-bit feedback scheme is very close in terms of frequency efficiency to that for the case where channel state information (CSI) of all users is perfectly known.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An uplink scheduling method using one bit per user feedback, comprising:

receiving one-bit feedback of the user's channel condition from a plurality of users, the one-bit feedback of the user's channel condition corresponds to a value of the cumulative distribution function of the user's instantaneous achievable rate;

selecting a user from the users whose channel condition is equal to or greater than a predetermined threshold, wherein the predetermined threshold is determined by the equation:

$$\gamma_0 = K^{-1/(k-1)}$$

where $\gamma_0$ is the predetermined threshold and K is the number of the plurality of users; and transmitting data at an instantaneous achievable rate of the selected user.

2. The uplink scheduling method using one bit per user feedback according to claim 1, wherein the one-bit feedback of the user's channel condition is 1 when the value of the cumulative distribution function of the user's instantaneous achievable rate is equal to or greater than the predetermined threshold, and wherein the one-bit feedback of the user's channel condition is 0 when the value of the cumulative distribution function of the user's instantaneous achievable rate is smaller than the predetermined threshold.

3. The uplink scheduling method using one bit per user feedback according to claim 2, wherein said selecting includes selecting a user from the users whose channel condition has the one-bit feedback of 1.

4. The uplink scheduling method using one bit per user feedback according to claim 1, further comprising, before said transmitting, selecting a user from the plurality of users if there is no user whose channel condition is equal to or greater than the predetermined threshold.

* * * * *